US010838771B2

(12) United States Patent
Ljung et al.

(10) Patent No.: US 10,838,771 B2
(45) Date of Patent: Nov. 17, 2020

(54) USER EQUIPMENT SELECTION FOR MOBILE EDGE COMPUTING

(71) Applicant: Sony Corporation, Tokyo (JP)

(72) Inventors: Rickard Ljung, Helsingborg (SE); Linh Trang, Aakarp (SE); Anders Berggren, Lund (SE)

(73) Assignee: SONY CORPORATION, Tokyo (JP)

( * ) Notice: Subject to any disclaimer, the term of this patent is extended or adjusted under 35 U.S.C. 154(b) by 3 days.

(21) Appl. No.: 16/070,018

(22) PCT Filed: Jan. 14, 2016

(86) PCT No.: PCT/EP2016/050628
§ 371 (c)(1),
(2) Date: Jul. 13, 2018

(87) PCT Pub. No.: WO2017/121478
PCT Pub. Date: Jul. 20, 2017

(65) Prior Publication Data
US 2019/0042318 A1 Feb. 7, 2019

(51) Int. Cl.
*G06F 15/16* (2006.01)
*G06F 9/50* (2006.01)
(Continued)

(52) U.S. Cl.
CPC .......... *G06F 9/5072* (2013.01); *G06F 9/5027* (2013.01); *G06F 9/5044* (2013.01);
(Continued)

(58) Field of Classification Search
CPC .... G06F 9/5072; G06F 9/5027; G06F 9/5044; H04W 76/14; H04W 76/11; H04W 8/24; H04W 8/26
(Continued)

(56) References Cited

U.S. PATENT DOCUMENTS

2010/0309784 A1* 12/2010 Mihaly ............... H04L 12/5692
370/230
2012/0208571 A1* 8/2012 Park .................... H04L 67/1063
455/466

(Continued)

OTHER PUBLICATIONS

International Search Report and Written Opinion of the International Searching Authority corresponding to International Patent Application No. PCT/EP2016/050628 dated Oct. 18, 2016 (10 pages).

(Continued)

*Primary Examiner* — Atta Khan
(74) *Attorney, Agent, or Firm* — Myers Bigel, P.A.

(57) ABSTRACT

An access node of a mobile communication network controls access of a group of user equipments to the mobile communication network. The access node selects one or more of the user equipments of the group as candidate user equipment for supporting mobile edge computing. The access node then sends an indication of the one or more candidate user equipments to a mobile edge computing server. The mobile edge computing server receives the indication and selects at least one target user equipment for execution of computational tasks from the candidate user equipments. The mobile edge computing server then distributes a computational task to the selected at least one target user equipment.

17 Claims, 7 Drawing Sheets

(51) Int. Cl.
*H04W 76/14* (2018.01)
*H04W 76/11* (2018.01)
*H04W 8/24* (2009.01)
*H04W 8/26* (2009.01)

(52) U.S. Cl.
CPC ............. *H04W 8/24* (2013.01); *H04W 8/26* (2013.01); *H04W 76/11* (2018.02); *H04W 76/14* (2018.02)

(58) Field of Classification Search
USPC ........................................................ 709/201
See application file for complete search history.

(56) References Cited

U.S. PATENT DOCUMENTS

2013/0303221 A1   11/2013   Otomo et al.
2015/0208338 A1*   7/2015   Wang ................... H04W 48/20
                                              370/328

OTHER PUBLICATIONS

Hu et al. "Mobile Edge Computing—A key technology towards 5G" ETSI White Paper No. 11, First Edition, Sep. 2015 (16 pages).

* cited by examiner

USER EQUIPMENT SELECTION FOR MOBILE EDGE COMPUTING

CROSS REFERENCE TO RELATED APPLICATIONS

This application is a 35 U.S.C. § 371 national stage application of PCT International Application No. PCT/EP2016/050628, filed on Jan. 14, 2016, the contents of which are incorporated herein by reference in its entirety. The above-referenced PCT International Application was published in the English language as International Publication No. WO 2017/121478 A1 on Jul. 20, 2017.

FIELD OF THE INVENTION

The present invention relates to methods of supporting mobile edge computing in a mobile communication network and to corresponding devices.

BACKGROUND OF THE INVENTION

For mobile communication networks, such as a cellular network based on the LTE (Long Term Evolution) radio technology specified by 3GPP (3rd Generation Partnership Project), an enhancement referred to as Mobile Edge Computing (MEC) has been proposed. The MEC technology is for example outlined in "Mobile-Edge Computing—Introductory Technical White Paper" published online by the European Telecommunications Standards Institute (EISI). The term "MEC" in this context refers to a network architecture that enables cloud computing and support of an IT (Information Technology) service environment at the edge of the cellular network, i.e., in close proximity to subscribers of the cellular network.

The MEC technology aims at providing cloud-computing capabilities within a Radio Access Network (RAN) part or core network (CN) part of the mobile communication network. The MEC technology also allows for utilizing a UE (user equipment) as computational resource. This may for example enable allow for performing computational tasks related to such UE with reduced latency or for offloading computational tasks from the network to the UEs. However, in the case of utilizing UEs as computational resources, a typically high and variable number of UEs needs to be considered when setting up an MEC configuration in which computational tasks can be distributed by an MEC server to one or more UEs capable of supporting MEC.

Accordingly, there is a need for techniques that allow for efficiently supporting MEC by utilizing one or more UEs as computational resources.

SUMMARY OF THE INVENTION

According to an embodiment of the invention, a method of supporting Mobile Edge Computing (MEC) is provided. According to the method, an access node of a mobile communication network controls access of a group of user equipments (UEs) to the mobile communication network. The access node may for example correspond to a base station, e.g., an eNB of the LTE technology. The access node selects one or more of the UEs of the group as candidate UE for supporting MEC. The access node then sends an indication of the one or more candidate UEs to an MEC server. The indication may for example be sent in terms of a list identifying the candidate UEs, e.g., in terms of a network address.

According to an embodiment, the access node receives an indication from at least one UE of the group, e.g., during establishment of a radio connection of the UE to the access node. The indication indicates one or more capabilities of the UE. The capabilities may for example include whether the UE is capable of supporting MEC. The latter capability could be provided in terms of an MEC support capability indicator. However, also other capabilities may be indicated as an alternative or in addition. For example, such capabilities may allow for deriving the UE's capability to support MEC. Examples of such capabilities are UE type, type or operating parameters of one or more processors of the UE, available storage, servers capabilities, or a performance classification of the UE (e.g., in terms of "low performance" and "high performance"). The access node may then perform the selection of the candidate UE(s) on the basis of the received indication.

According to an embodiment, the access node may receive, from at least one UE of the group, information on local conditions at the UE. The access node may then perform the selection of the candidate UEs based on the received information on local conditions at the UE. The information on local conditions at the UE may for example include information radio conditions at the UE, e.g., in terms of RSRP (Reference Signal Received Power) or RSRQ (Reference Signal Received Quality) measured by the UE. Alternatively or in addition, the information on local conditions at the UE may include information on mobility of the UE, e.g., based of measurements performed by the UE. The mobility may for example be indicated in terms of a direction of movement or velocity. Alternatively or in addition, the mobility could be indicated in terms of a mobility classification (e.g., in terms of "low mobility" and "high mobility").

According to an embodiment, the access node may receive a request for support of MEC from the MEC server. The access node may then perform the selection of the candidate UEs, and typically also the sending of the indication of the candidate UEs in response to receiving the request from the MEC server. Alternatively or in addition, the access node may also perform the selection and/or sending of the indication in response to a triggering event at the access node, e.g., in response to a number of UEs in the group which are capable of supporting MEC exceeding a threshold.

According to a further embodiment of the invention, a method of supporting MEC is provided. According to the method, and MEC server receives, from an access node of a mobile communication network, an indication of one or more candidate UEs for supporting MEC. The access node may for example correspond to a base station, e.g., an eNB of the LTE technology. The indication may for example be received in terms of a list identifying the candidate UEs, e.g., in terms of a network address. From the one or more candidate UEs, the MEC server selects at least one target UE for execution of computational tasks. The MEC server then distributes a computational task to the selected at least one target UE. According to an embodiment, the MEC server may send a request for support of MEC to the access node and receive the indication of the candidate UE(s) in response to the request.

According to an embodiment, the MEC server receives, from at least one candidate UE, information on local conditions at the candidate UE. The MEC server may then perform the selection of the at least one target UE based on the received information on local conditions at the candidate UE. The information on local conditions at the candidate UE may for example include information on current computational capacity of the candidate UE and/or information on current computational demands of the candidate UE. According to an embodiment, the MEC server may send a request to at least one of the candidate UEs and receive the information on local conditions in response to the request.

According to a further embodiment of the invention, an access node is provided. The access node may for example correspond to a base station, e.g., an eNB of the LTE technology. The access node comprises a radio interface to a group of one or more UEs. Further, the access node comprises a network interface to an MEC server. Further, the access node comprises one or more processors. The one or more processors are configured to control access of the group of UEs to the mobile communication network, to select one or more of the UEs of the group as candidate UE for supporting MEC, and to send an indication of the one or more candidate UEs to the MEC server. Specifically, the one or more processors may be configured to perform steps of the above-mentioned method performed by the access node.

According to a further embodiment of the invention, an MEC server is provided. The MEC server comprises an interface to an access node of a mobile communication network. The access node may for example correspond to a base station, e.g., an eNB of the LTE technology. Further, the MEC server comprises one or more processors. The one or more processors are configured to receive, from the access node, an indication of one or more candidate UEs for supporting MEC, to select, from the one or more candidate UEs, at least one target UE for execution of computational tasks, and to distribute a computational task to the selected at least one target UE. Specifically, the one or more processors may be configured to perform steps of the above-mentioned method performed by the MEC server.

According to a further embodiment of the invention, a system is provided. The system comprises an access node of a mobile communication network and an MEC server. The access node is configured to control access of a group of UEs to the mobile communication network, to select one or more of the UEs of the group as candidate UE for supporting MEC, and to send an indication of the one or more candidate UEs to the MEC server. The MEC server is configured to receive the indication from the access node, to select, from the one or more candidate UEs, at least one target UE for execution of computational tasks, and to distribute a computational task to the selected at least one target UE. Specifically, the access node and the MEC server may be configured to perform steps of the above-mentioned methods.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to support of MEC in a mobile communication network. In the illustrated examples, it is assumed that the mobile communication network is based on the LTE technology. However, it is to be understood that also other mobile communication technologies could be used in as an alternative or in addition, e.g., other cellular radio technologies or a WLAN (Wireless Local Area Network) technology.

Figure 1:
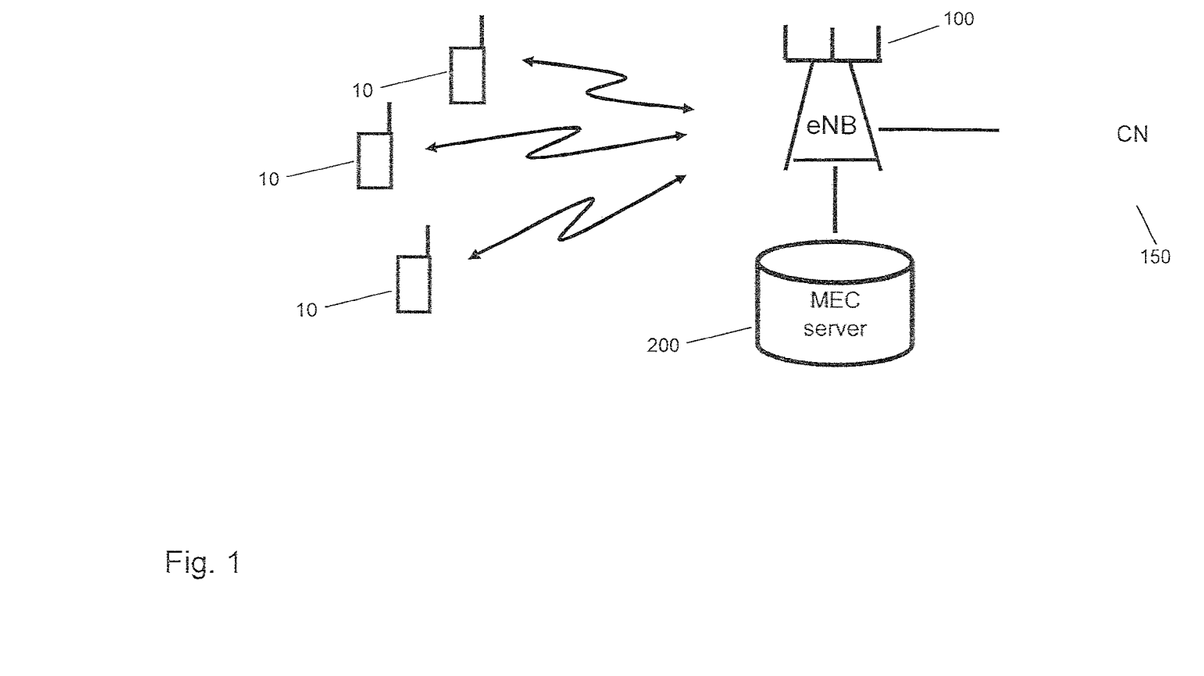
FIG. 1 schematically illustrates a mobile communication system according to an embodiment of the invention.

FIG. 1 schematically illustrates a mobile communication system. More specifically, FIG. 1 shows infrastructure of the mobile communication network in the form of a base station 100, in accordance with the assumed utilization of the LTE technology referred to as "eNB (evolved Node B)", and a core network (CN) 150. Further, FIG. 1 shows a group of UEs 10 which are connected via the eNB 100 to the mobile communication network. Accordingly, the eNB 100 provides and controls access of the UEs 10 to the mobile communication network. For example, the UEs 10 may be connected to one or more cells served by the eNB 100.

Further, FIG. 1 shows an MEC server 200 which is assumed to be responsible for managing one or more MEC services at the site of the eNB 100. The MEC server 200 may for example be co-located with the eNB 100, with the aim of hosting the MEC services in close proximity to mobile subscribers, e.g., mobile subscribers utilizing one or more of the UEs 10. Examples of such services are location-specific content delivery services or location-specific marketing services, or services for which low latency is desirable. However, also many other kinds of services may benefit from MEC. Further, MEC may allow for reducing the load on centralized network infrastructure by offloading certain tasks to more peripheral sites, such as to the MEC server 200 co-located with the eNB 100. The MEC server 200 may utilize dedicated infrastructure for performing MEC computational tasks. Further, the MEC server 200 may also distribute MEC computational tasks to other infrastructure at the site of the eNB 100. For example, the MEC server 200 could also utilize computational resources of the eNB 100 for performing MEC computational tasks. In the illustrated examples, it is specifically assumed that the MEC server 200 may also distribute MEC computational tasks to one or more of the UEs 10. Accordingly, the UEs 10 may be utilized as resources for performing MEC computational tasks. Such assistance of MEC by the UEs is in the following also referred to as support of MEC by UEs. The concepts as further detailed below aim at efficiently organizing and managing support of MEC by one or more of the UEs 10.

Figure 2:
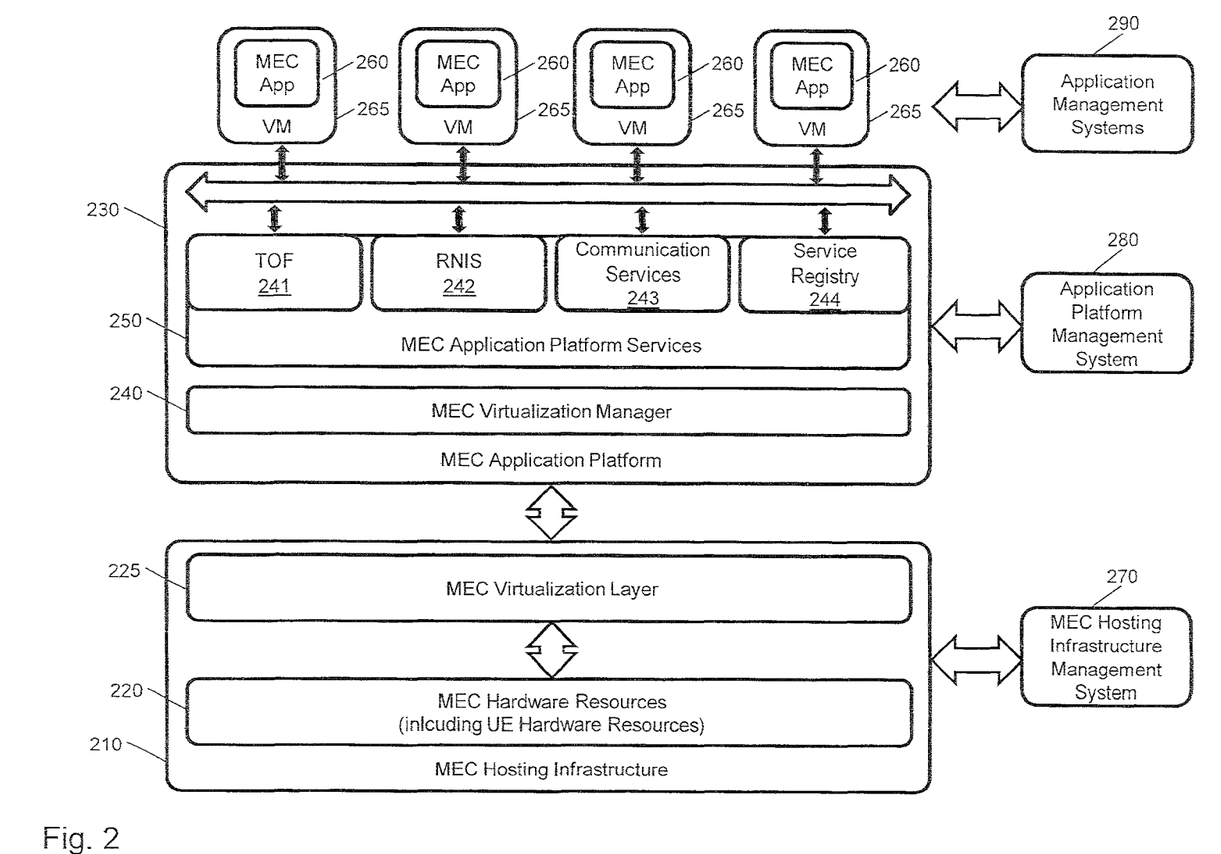
FIG. 2 shows an example of an MEC architecture which may be utilized in embodiments of the invention.

FIG. 2 shows an example of an MEC architecture which may be utilized for implementing the illustrated concepts. The exemplary MEC architecture of fig to is based on the MEC architecture as described in the ETSI publication "Mobile-Edge Computing—Introductory Technical White Paper", and concerning further details of the illustrated architectural components reference is made to this publication. However, it is to be understood that other MEC architectures could be utilized as well.

As illustrated, the MEC architecture of FIG. 2 includes an MEC hosting infrastructure 210 providing MEC hardware resources 220. The MEC hardware resources 220 may include dedicated hardware resources of the MEC server 200, but also hardware resources shared with other elements. As mentioned above, in the illustrated scenarios it is assumed that the MEC hardware resources 220 also include UE hardware resources, e.g., hardware resources of the UEs 10.

As further illustrated, the MEC hosting infrastructure 210 further provides an MEC virtualization layer 225. The MEC virtualization layer 225 is responsible for providing an MEC application platform 230 on the basis of the MEC hardware resources 220. The MEC application platform 230 provides an MEC virtualization manager 240 and a set of MEC application platform services 250. In the illustrated example, the MEC application platform services are assumed to include a Traffic Offload Function (TOF) 241, Radio Network Information Services (RNIS) 242, communication services 243, and a service registry 244. However, it is to be understood that additional or alternative types of MEC application platform services could be provided as well.

The MEC application platform 230 may be used to provide one or more MEC applications 260 (also referred to as "MEC app"). As illustrated, each MEC application 260 may be executed in a corresponding virtual machine (VM) 265 posted on the MEC application platform 230. By means of the MEC applications 260, various kinds of MEC services may be provided.

The MEC architecture of FIG. 2 further provides management components in the form of an MEC hosting infrastructure management system 270, an application platform management system 280, and application management systems 290. The MEC hosting infrastructure management system 270 is assumed to be responsible for managing and controlling available MEC hardware resources. As further described below, this may also include selection of UEs for executing MEC computational tasks. The application platform management system 280 may for example be responsible for managing and controlling the MEC application platform, e.g., with respect to operation of the MEC virtualization manager 240 and/or the MEC application platform services 250 and configuration of related parameters. The application management systems 290 may for example be responsible for managing and controlling the individual MEC applications 260. This may also involve installation or the installation of individual MEC applications 264 configuration of parameters related to such individual MEC application 260.

As mentioned above, concepts as illustrated herein aim at efficiently managing utilization of UE's for performing MEC computational tasks. For this purpose, a two-stage selection process may be applied, in which an initial selection of candidate UEs for supporting MEC is made by the eNB 100, and then a final selection of at least one target UE for execution of MEC computational tasks is made by the MEC server 200 from the candidate UEs selected by the eNB 100. Accordingly, concepts as illustrated herein involve that the eNB 100 or a similar access node of the mobile communication network determines and indicates the candidate UEs for supporting MEC to the MEC server 200. The initial selection of candidate UEs by the eNB 100 can be based on various kinds of information available at the eNB 100, e.g., on information derived from radio measurements performed by the eNB 100, cell statistics generated by the eNB 100, or information on mobility of UEs as observed by the eNB 100. Further, the initial selection of candidate UEs can be based on information obtained by the eNB 100 from the UEs 10 connected to the eNB 100. Corresponding information may for example include radio measurements performed by the UE 10, e.g., measurements of RSRP or RSRQ, mobility of the UEs 10, e.g., in terms of direction of movement and/or velocity or in terms of a mobility classification, and/or capabilities of the UEs 10. An example of such capability could be an indicator whether a certain UE 10 is capable of supporting MEC or not. However, also other capabilities could be considered, from which the eNB 100 can then derive whether a certain UE 10 is capable of supporting MEC, e.g., UE category, such as smartphone or MTC (Machine Type Communication) UE, type of processor(s) installed in the UE 10, size of memory installed in the UE 10, type of operating software installed on the UE 10, or the like. In some scenarios, the eNB 100 may also base the initial selection of candidate UEs on information obtained from one or more other nodes of the mobile communication network, such as mobility information from an MME (Mobility Management Entity) or similar control node and/or subscriber information from an HSS (Home Subscriber Server) or similar subscriber database.

The eNB 100 may indicate the selected candidate UE(s) in terms of a list of UE identifiers to the MEC server 200. The UE identifier could for example correspond to a network address, such as an IP (Internet Protocol) address, or to a TMSI (Temporary Mobile Subscriber Identity).

The final selection performed by the MEC server 200 may then be based on conditions at the MEC server 200, such as current computational demands. Alternatively or in addition, the final selection performed by the MEC server 200 may be based on information obtained from the individual candidate UEs indicated to the MEC server 200. For example, the MEC server 200 could request information on local conditions from one or more of the indicated candidate UEs and perform the final selection on the basis of the indicated local conditions. Such local conditions may for example include current available computing capacity and/or memory, or current battery status. In some scenarios, the local conditions could also include current computational demands of the candidate UE. For example, if a certain candidate UE utilizes an MEC service, this candidate UE could also be selected for execution of MEC computational tasks.

Figure 3:
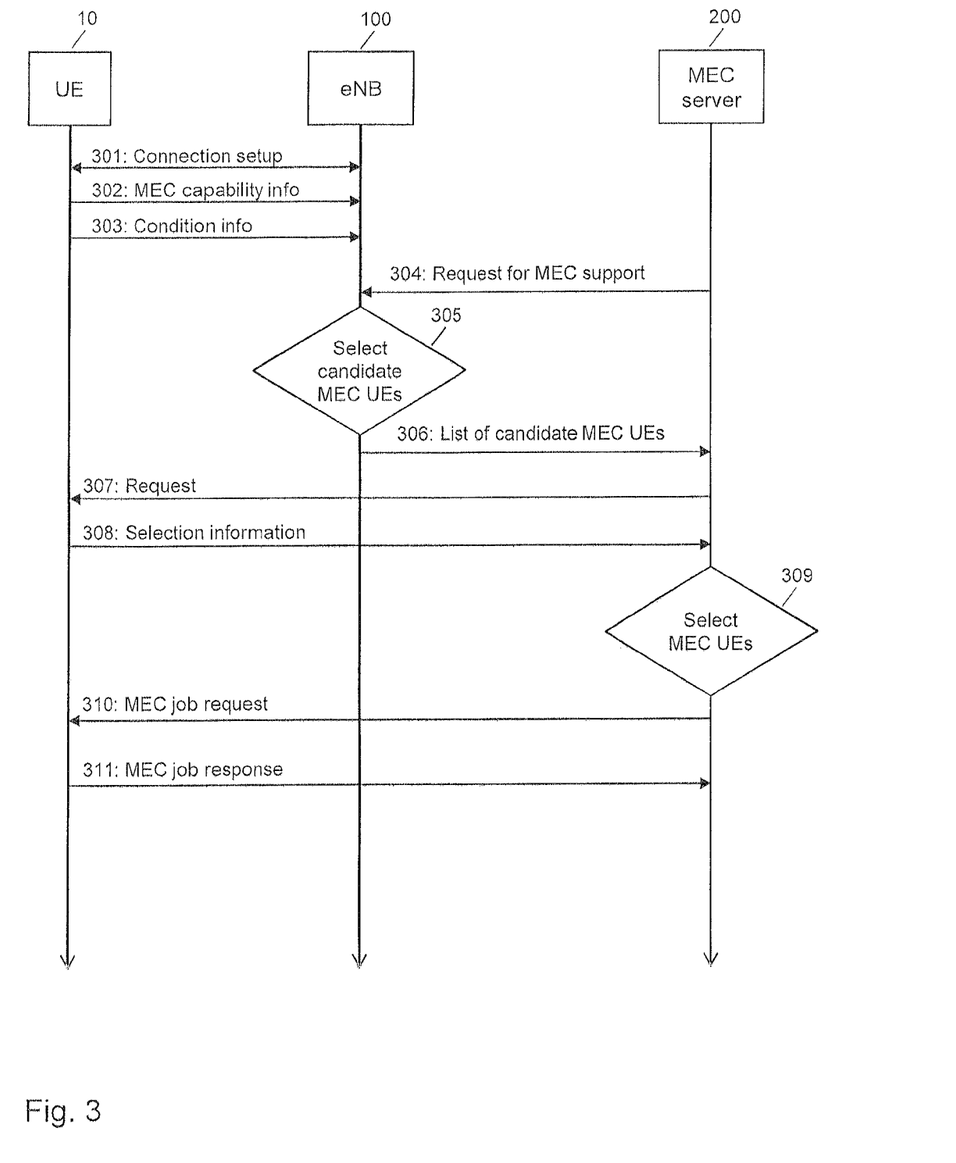
FIG. 3 schematically illustrates an exemplary MEC support procedure according to an embodiment of the invention.

FIG. 3 shows exemplary processes in which MEC support is managed in accordance with the concepts as outlined above. The processes of FIG. 3 involve one of the UE's 10, the eNB 100, and the MEC server 200.

In the example of FIG. 3, the UE 10 and the eNB 100 set up a radio connection at 301. This may for example involve performing an RRC (Radio Resource Control) connection setup procedure as specified for the LTE technology. As further illustrated, the UE 10 may indicate MEC capability information 302 to the eNB 100. For example, the UE 10 may send an indicator of whether the UE 10 is capable of supporting MEC. Alternatively or in addition, the UE 10 may send other capability information from which the eNB 100 is able to derive whether the UE 10 is capable of supporting MEC. The MEC capability information 302 may be indicated during the connection setup procedure 301, e.g., in one or more messages of the connection setup procedure 301. Further, the MEC capability information 302 may be indicated separately from the connection setup procedure 301, e.g., in a dedicated message.

As further illustrated, the UE 10 may also send condition information 303 to the eNB 100. The condition information 303 may for example include information on radio conditions, e.g., based on measurements performed by the UE 10, such as measurements of RSRP or RSRQ. Further, the condition information 303 could also include information on a mobility status of the UE 10, e.g., in terms of a classification as "low mobility" or "high mobility" (or as one or more intermediate mobility classes). The UE 10 may send the condition information 303 in response to a request from the eNB 100. Further, the UE 10 could send the condition information 303 in response to locally detecting a triggering event, e.g., change of radio conditions and/or change of mobility status. The condition information 303 may be sent in a regular manner, thereby allowing the eNB 100 to obtain updated information on conditions at the UE 10 after the radio connection between the UE 10 and the eNB 100 is established.

As further illustrated, at some time the MEC server 200 then sends a request 304 for MEC support to the eNB 100. The MEC server 200 may send the request 304 in response to requiring further computational resources for executing MEC computational tasks, i.e., on an as-needed-basis. However, the request 304 may also be provided in terms of a subscription of the MEC server 200 to be informed by the eNB 100 if MEC support by one or more UEs connected to the eNB 100 is available. In the latter case, further actions of the eNB 100 as described below could be triggered by evaluation of conditions by the eNB 100. For example, if the eNB 100 determines that among the UEs 10 connected to the eNB 100 a number of UEs 10 capable of supporting MEC exceeds a threshold, the eNB 100 may proceed to step 305 to select a candidate MEC UEs. If the request 304 is sent on an as-needed-basis, the selection of candidate MEC UEs at step 305 may be triggered by the eNB 100 receiving the request 304.

As mentioned above, the selection of candidate UEs at step 305 may be based on consideration of various criteria by the eNB 100. For example, the eNB 100 may consider the MEC capability information 302 and/or the condition information 303 as received before from the UE 10. Further, the eNB 100 may consider corresponding information as received from other UEs 10. Further, the eNB 100 may consider information otherwise available at the eNB 100, e.g., information obtained by measurements performed by the eNB 100 itself or information received from other nodes of the mobile communication network, such as information from an MME or HSS.

As illustrated, the eNB 100 then sends a list 306 of candidate MEC UEs to the MEC server 200. In the list, the candidate MEC UEs may for example be identified in terms of their TMSI, IP address, or similar identifier.

Having received the list 306, the MEC server 200 may proceed to request further information from one or more of the candidate MEC UEs. In the example of FIG. 3, the MEC server 200 sends a request 307 to the UE 10, which responds by sending selection information 308 to the MEC server 200. In this communication, the MEC server 200 may utilize the identifier indicated in the list 306 to address the UE 10. As mentioned above, the selection information 308 may include information on local conditions at the UE 10, e.g., information on currently available computing capacity and/or currently available memory, current battery status, or current computational demands.

It should be noted that the communication involving the request 307 and the response to this request 307 by the selection information 308 is assumed to be performed on a higher protocol layer than the communication between the UE 10 and the eNB 100 involving messages 301, 302, or 303. Specifically, it is to be understood that also the request 307 and the selection information 308 would actually be conveyed through the eNB 100, which provides the radio connection to the UE 10. However, these messages may be conveyed on a higher protocol layer, in a manner which is transparent to the eNB 100.

The MEC server 200 may then select at least one target MEC UE from the list 306 of candidate MEC UEs received from the eNB 100. This selection may be based on local conditions at the MEC server 200, e.g., computational demands. For example, in the case of high computational demands, the MEC server 200 may select all of the indicated candidate MEC UEs. Otherwise, the MEC server 200 could select only a subset of one or more of the indicated candidate MEC UEs. Further, the selection at step 309 may also be based on the selection information 308 received from UE 10 and also on corresponding information received from other candidate MEC UEs. For example, the MEC server 200 could select a subset of those candidate MEC UEs which offer the highest available computing capacity, the highest available memory, and/or a battery status above a certain threshold. In this way, it can be avoided that a UE is selected which is potentially overloaded by assigned MEC computational tasks or for which is signed computational tasks might cause unacceptable battery drain. In the exemplary scenario of FIG. 3, it is assumed that at least the UE 10 is selected as target MEC UE for execution of MEC computational tasks.

The MEC server 200 may then distribute MEC computational tasks to the selected target MEC UEs. In the example of FIG. 3, this involves that the MEC server 200 sends an MEC job request 310 to the UE 10 and that the UE 10 responds with an MEC job response 311 to the MEC server 200. In this communication, the MEC server 200 may utilize the identifier indicated in the list 306 to address the UE 10. The MEC job request 310 may define one or more computational tasks to be executed by the UE 10, and the MEC job response 311 may include results obtained through execution of such computational task(s).

Again, it should be noted that the communication involving the MEC job request 310 and the MEC job response 311 is assumed to be performed on a higher protocol layer than the communication between the UE 10 and the eNB 100 involving messages 301, 302, or 303. Specifically, it is to be understood that also the MEC job request 310 and the MEC job response 311 would actually be conveyed through the eNB 100, which provides the radio connection to the UE 10. However, these messages may be conveyed on a higher protocol layer, in a manner which is transparent to the eNB 100.

Figure 4:
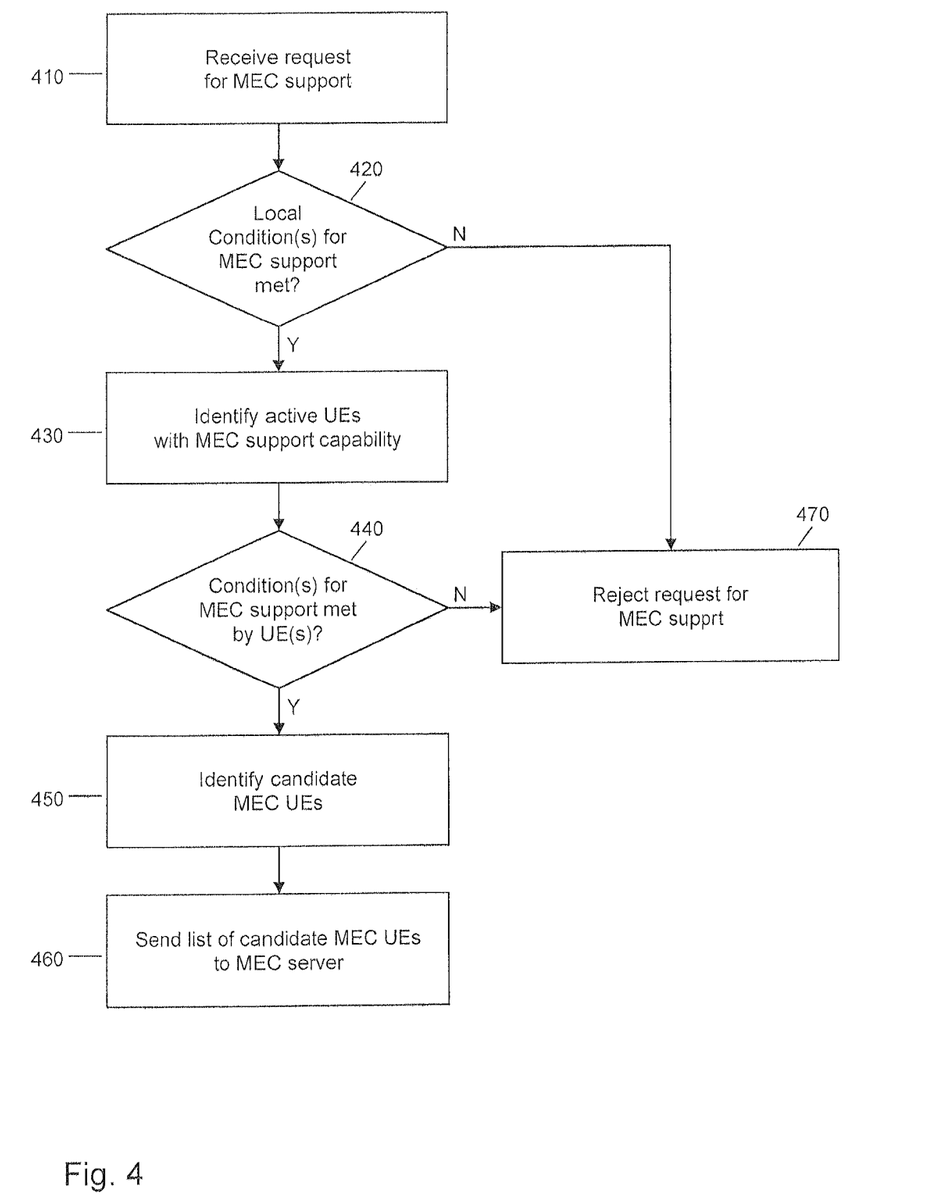
FIG. 4 shows a flowchart for illustrating a method according to an embodiment of the invention, which may be implemented by an access node of a mobile communication network.

FIG. 4 shows a flowchart illustrating a method of supporting MEC, by which an access node of a mobile communication network, such as the eNB 100, may implement concepts as described above. If a processor based implementation of the access node is utilized, at least a part of the steps of the method may be performed and/or controlled by one or more processors of the access node.

At step 410, the access node may receive a request for MEC support from an MEC server, e.g., the MEC server 200. An example of such request is the above-mentioned request 304. The request may be transmitted by the MEC server on an as-needed-basis or in terms of a subscription to be informed by the access node about candidate UEs available for MEC support.

At 420, the access node may evaluate one or more local conditions to assess whether MEC support is possible from the perspective of the access node. This may for example involve checking available resources of the access node. For example, if an interface load or processor load of the access node exceeds a threshold, the access node may determine that MEC support by UEs connected to the access node is not feasible from the perspective of the access node, because otherwise there is a risk of overloading the access node in terms of processor or interface capacity. However, it is to be understood that other criteria could be evaluated as well in step 420.

If the evaluation of step 420 reveals that local conditions MEC support are met, the access node may continue to step 430, as indicated by branch "Y".

At step 430, the access node may identify, among a group of UEs connected to the access node, such as the UEs 10, active UEs with MEC support capability. For this purpose, the access node may evaluate one or more indications of capabilities received by the access node. An example of such indication is the above-mentioned capability information 302. The indication(s) may be received from the UEs connected to the access node, e.g., during establishment of a radio connection of the UE to the access node. In addition or as an alternative, such indication(s) may also be received from other nodes of the mobile communication network, such as a control node responsible for controlling mobility procedures, e.g., an MME of the LTE technology, or a subscriber database, e.g., an HSS of the LTE technology.

At step 440, the access node may evaluate if one or more conditions for MEC support are met by the UE(s) identified at step 430. The evaluation of step 440 may be based on information which is available at the access node for purposes of controlling access of the UE(s) to the mobile communication network, e.g., information based on measurements performed by the access node. The evaluation of step 440 may also be based on information on conditions at the UE as received from the UE. Examples of such information on local conditions are information on radio conditions at the user equipment or information on mobility of the user equipment. The information on radio conditions or mobility may be based on measurements performed by the UE, e.g., measurements of RSRP or RSRQ or Doppler measurements. The access node may receive such information on local conditions in response to sending a request to the UE. If the conditions for MEC support at the UE are met for at least one of the considered UEs, the access node may proceed to step 450, as indicated by branch "Y".

At step 450, the access node may identify candidate UEs for support of MEC. Specifically, these candidate UEs may be identified as UEs for which the evaluation of step 440 revealed that the conditions for MEC support are met. As a result, the access node may determine a set of one or more candidate UEs for MEC support, e.g., in terms of a list of one or more candidate UEs.

At step 460, the access node may send an indication of the candidate UEs for support of MEC to the MEC server, e.g., by sending the list determined at step 460 to the MEC server. The indication may identify each candidate UE in terms of a network address, e.g., IP address, or a network assigned temporary identity, e.g., a TMSI.

If the evaluation of step 420 reveals that MEC support is not feasible from the perspective of the access node, or if the evaluation of step 440 reveals that the conditions for MEC support are met for none of the considered UEs the access node may proceed to step 470, as indicated by branch "N", and reject the request for MEC support.

Figure 5:
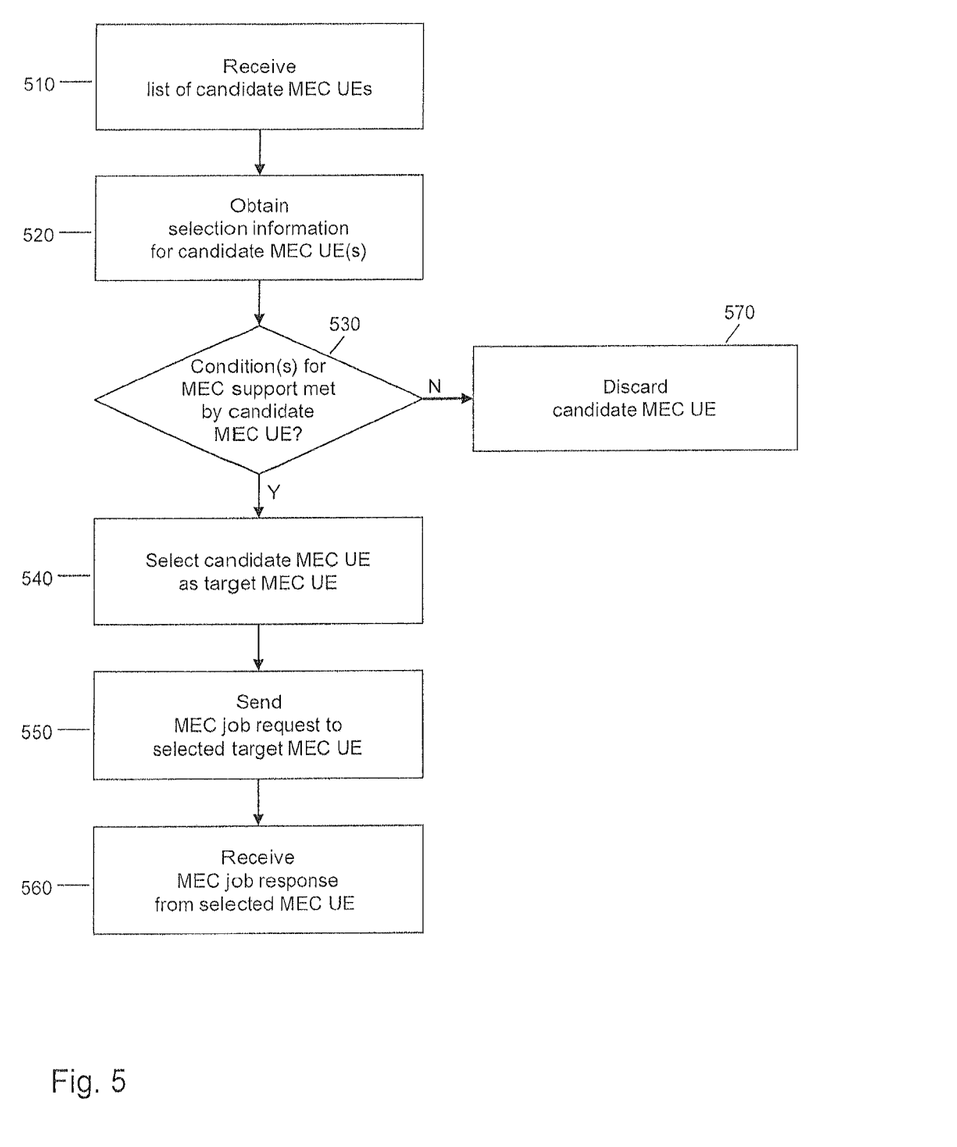
FIG. 5 shows a flowchart for illustrating a further method according to an embodiment of the invention, which may be implemented by an MEC server.

FIG. 5 shows a flowchart illustrating a method of supporting MEC, by which an MEC server, such as the MEC server 200, may implement concepts as described above. If a processor based implementation of the MEC server is utilized, at least a part of the steps of the method may be performed and/or controlled by one or more processors of the MEC server.

At step 510, the MEC server may receive an indication of candidate UE's for support of MEC from an access node of a mobile communication network, e.g., from the eNB 100. The indication may for example be received in the form of a list of one or more candidate UEs. The indication may identify each candidate UE in terms of a network address, e.g., IP address, or a network assigned temporary identity, e.g., a TMSI.

At step 520, the MEC server may receive, from one or more of the indicated candidate UEs, information on local conditions at the UE. This information may serve as selection information for making a further selection from the indicated candidate UEs. The information received at step 520 may for example include information on current computational capacity of the candidate UE, e.g., in terms of available computing capacity and/or available memory, and/or information on current computational demands of the candidate UE. An example of such information is the above-mentioned selection information 308. The MEC server may receive the information in response to sending a request to the respective UE. An example of such request is the above-mentioned request 307.

At step 530, the MEC server may evaluate whether conditions for MEC support are met by a certain candidate UE. This evaluation may involve checking the information on conditions at the UE as received at step 520. Further, this may involve checking various local criteria at the MEC server, e.g., current computational demands of the MEC server and/or utilization of MEC services by the considered candidate UE.

The evaluation of step 530 reveals that conditions for MEC support are met for the candidate UE, the MEC server may proceed to step 540 and select this candidate UE as target UE for execution of MEC computational tasks, as indicated by branch "Y".

Having selected the candidate UE as target MEC UE, the MEC server may proceed by distributing one or more computational tasks to the selected target MEC UE. This may involve sending an MEC job request to the selected target MEC UE, as indicated by step 550, and may also involve receiving an MEC job response from the selected target MEC UE, as indicated by step 560. Examples of such MEC job request and MEC job response are the above-mentioned MEC job request 310 and MEC job response 311.

If the evaluation of step 530 reveals that the conditions for MEC are not met by the considered candidate UE, the MEC server may proceed to step 570 and discard this candidate UE, as indicated by branch "N".

It is to be understood that the actions of step 530, 540, 550, 560, and 570 may be performed for each candidate UE indicated to the MEC server and that, as a result, one or more target MEC UE's may be selected by the MEC server. When considering multiple candidate UEs, the evaluation of step 530 may also involve comparing conditions for individual candidate UEs to each other and selecting that one of these individual candidate UEs for which the evaluation indicates more favorable conditions.

Further, it is to be understood that the methods of FIGS. 4 and 5 may also be combined in a system including an access node operating according to the method of FIG. 4 and an MEC server operating according to the method of FIG. 5.

Figure 6:
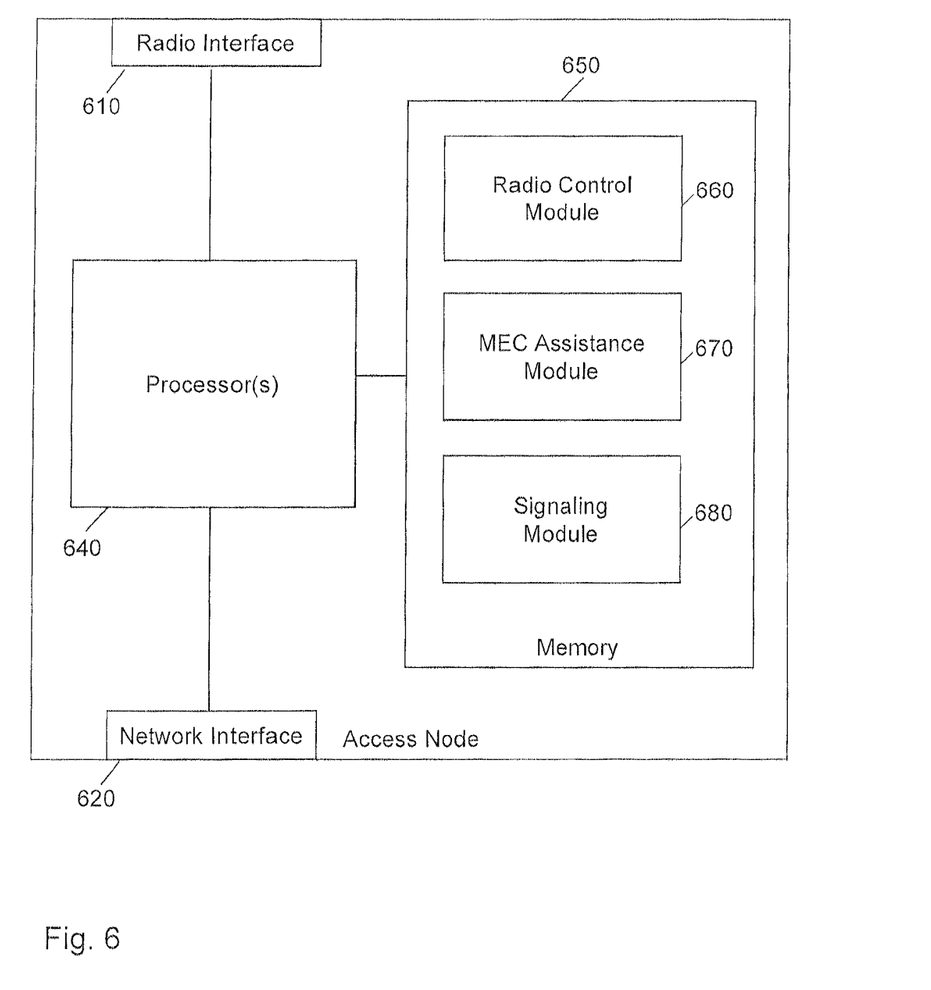
FIG. 6 schematically illustrates a processor-based implementation of an access node according to an embodiment of the invention.

FIG. 6 shows a block diagram for schematically illustrating a processor based implementation of an access node, which may be utilized for implementing the above concepts. The access node may for example correspond to a base station of a cellular radio access technology, e.g., an eNB of the LTE technology, such as the above-mentioned eNB 100.

As illustrated, the access node includes a radio interface 610. The access node may utilize the radio interface 610 for connecting to one or more UEs, such as the above-mentioned UEs 10. Further, the access node includes a network interface 620. The access node may utilize the network interface 620 for connecting to an MEC server, e.g., the MEC server 200.

Further, the access node is provided with one or more processors 640 and a memory 650. The radio interface 610, the network interface 620, and the memory 650 are coupled to the processor(s) 640, e.g., using one or more internal bus systems of the access node.

The memory 650 includes program code modules 660, 670, 680 with program code to be executed by the processor(s) 640. In the illustrated example, these program code modules include a radio control module 660, an MEC assistance module 670, and a signaling module 680.

The radio control module 660 may implement the above-described functionalities of controlling access of UEs to the mobile communication network, such as establishing a radio connection. The MEC assistance module 670 may implement the above-described functionalities of determining candidate UEs for MEC support. The signaling module 680 may implement the above-described functionalities of sending the indication of the candidate UEs to the MEC server. Further, the signaling module 680 may also implement the above-described functionalities of obtaining information from UEs or other nodes of the mobile communication network.

It is to be understood that the structures as illustrated in FIG. 6 are merely exemplary and that the access node may also include other elements which have not been illustrated, e.g., structures or program code modules for implementing known functionalities of an eNB or other type of access node.

Figure 7:
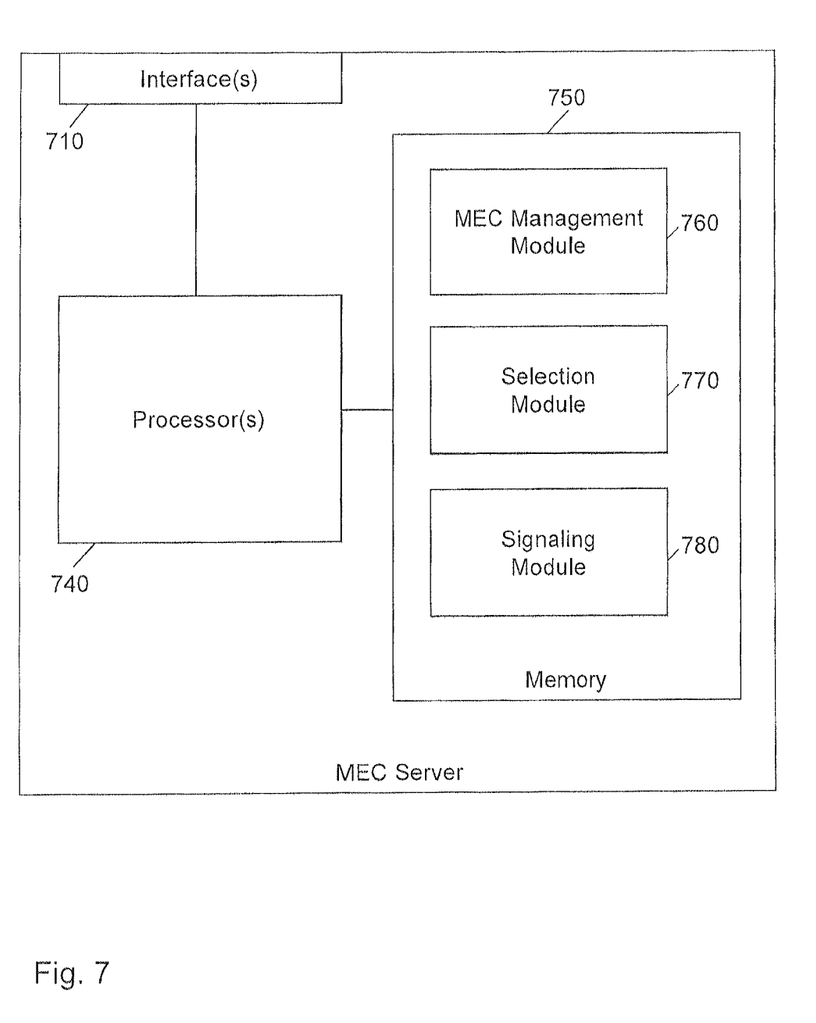
FIG. 7 schematically illustrates a processor-based implementation of an MEC server according to an embodiment of the invention.

FIG. 7 shows a block diagram for schematically illustrating a processor based implementation of an MEC server, which may be utilized for implementing the above concepts. The MEC server may for example correspond to the above-mentioned MEC server 200.

As illustrated, the MEC server includes one or more interface(s) 710. The MEC server may utilize the interface(s) 710 for connecting to an access node of a mobile communication network, such as the above-mentioned eNB 100.

Further, the MEC server is provided with one or more processors 240 and a memory 750. The interface(s) 710 and the memory 750 are coupled to the processor(s) 740, e.g., using one or more internal bus systems of the MEC server.

The memory 750 includes program code modules 760, 770, 780 with program code to be executed by the processor(s) 740. In the illustrated example, these program code modules include an MEC management module 760, a selection module 770, and a signaling module 780.

The MEC management module 760 may implement the above-described functionalities of managing MEC, such as by providing one or more MEC services and distributing MEC computational tasks to different MEC hardware resources. The selection module 770 may implement the above-described functionalities of selecting target UEs for execution of MEC computational tasks. The signaling module 780 may implement the above-described functionalities of receiving the indication of the candidate UEs from the access node. Further, the signaling module 780 may also implement the above-described functionalities of obtaining selection information.

It is to be understood that the structures as illustrated in FIG. 7 are merely exemplary and that the MEC server may also include other elements which have not been illustrated, e.g., structures or program code modules for implementing known functionalities of an MEC server.

It is to be understood that the concepts as explained above are susceptible to various modifications. For example, the concepts could be applied in connection with various kinds of radio technologies, without limitation to the LTE technology. Further, it is to be understood that the illustrated concepts may also be combined with various kinds of MEC architectures, e.g., MEC architecture is derived from the MEC architecture of FIG. 2 or alternative MEC architectures, without limitations to MEC architectures specified by ETSI. The MEC server may be provided at various locations, without limitation to the above-mentioned co-location with a base station. For example, the MEC server could be co-located with other nodes of the RAN. Further, the MEC server could be implemented by distributed hardware infrastructure, e.g., by a cloud system of multiple devices. Still further, the MEC server could at least in part be implemented by devices in the CN part of the cellular network. Further, it is to be understood that the MEC server may be part of the infrastructure of the mobile communication network, i.e., under control of the operator of the mobile communication network, or may be controlled by some other entity.

The invention claimed is:

1. A method of supporting mobile edge computing, the method comprising:
    controlling access, by an access node of a mobile communication network, of a group of user equipments to the mobile communication network;
    selecting, by the access node, one or more of the user equipments from the group as candidate user equipment for supporting mobile edge computing, based on measurements performed by the access node or performed by the UE; and
    sending, by the access node, an indication of said one or more candidate user equipments to a mobile edge computing server,
    wherein the indication enables the mobile edge computing server to select at least one target mobile edge computing user equipment from the one or more candidate user equipments for execution of computational tasks, and to distribute a computational task to the selected at least one target mobile edge computing user equipment.

2. The method according to claim 1, further comprising:
    receiving, by the access node, from at least one user equipment of the group, an indication of one or more capabilities of the user equipment; and
    performing, by the access node, said selecting based on the received indication.

3. The method according to claim 2, further comprising:
receiving, by the access node, the indication during establishment of a radio connection of the user equipment to the access node.

4. The method according to claim 1, further comprising:
receiving, by the access node, from at least one user equipment of the group, information on local conditions at the user equipment; and
performing, by the access node, said selecting based on the received information on local conditions at the user equipment.

5. The method according to claim 4,
wherein the information on local conditions at the user equipment comprise information on radio conditions at the user equipment and/or information on mobility of the user equipment.

6. The method according to claim 1, further comprising:
receiving, by the access node, a request for support of mobile edge computing from the mobile edge computing server; and
performing, by the access node, said selecting in response to receiving the request.

7. A method of supporting mobile edge computing, the method comprising:
receiving, by a mobile edge computing server, from an access node of a mobile communication network, an indication of one or more candidate user equipments selected from a group of user equipments for supporting mobile edge computing;
selecting, by the mobile edge computing server, at least one target user equipment from the one or more candidate user equipments for execution of computational tasks; and
distributing, by the mobile edge computing server, a computational task to the selected at least one target user equipment.

8. The method according to claim 7, further comprising:
receiving, by the mobile edge computing server, from at least one candidate user equipment, information on local conditions at the candidate user equipment; and
performing, by the mobile edge computing server, said selecting based on the received information on local conditions at the candidate user equipment.

9. The method according to claim 8,
wherein the information on local conditions at the candidate user equipment comprise information on current computational capacity of the candidate user equipment and/or information on current computational demands of the candidate user equipment.

10. The method according to claim 8, further comprising:
sending, by the mobile edge computing server, a request to at least one of the candidate user equipments; and
receiving, by the mobile edge computing server, the information on local conditions in response to the request.

11. The method according to claim 7, further comprising:
sending, by the mobile edge computing server, a request for support of mobile edge computing to the access node; and
receiving, by the mobile edge computing server, the indication in response to the request.

12. An access node for a mobile communication network, the access node comprising:
a radio interface to a group of one or more user equipments;
a network interface to a mobile edge computing server; and
one or more processors configured to perform operations comprising:
controlling access of the group of user equipments to the mobile communication network;
selecting one or more of the user equipments of the group as candidate user equipment for supporting mobile edge computing, based on measurements performed by the access node or performed by the UE; and
sending an indication of said one or more candidate user equipments to the mobile edge computing server,
wherein the indication enables the mobile edge computing server to select at least one target mobile edge computing user equipment from the one or more candidate user equipments for execution of computational tasks, and to distribute a computational task to the selected at least one target mobile edge computing user equipment.

13. The access node according to claim 12,
wherein the one or more processors are configured to perform operations comprising:
controlling access to a group of user equipments of the mobile communication network;
selecting one or more of the user equipments from the group as candidate user equipment for supporting mobile edge computing; and
sending an indication of said one or more candidate user equipments to a mobile edge computing server.

14. A mobile edge computing server, comprising:
an interface to an access node of a mobile communication network; and
one or more processors configured to perform operations comprising:
receiving, from the access node, an indication of one or more candidate user equipments selected from a group of user equipments for supporting mobile edge computing by execution of computational tasks;
selecting, from the one or more candidate user equipments, at least one target user equipment for execution of computational tasks, based on measurements performed by the access node or performed by the UE; and
distributing a computational task to the selected at least one target user equipment,
wherein the indication enables the mobile edge computing server to select at least one target mobile edge computing user equipment from the one or more candidate user equipments for execution of computational tasks.

15. The mobile edge computing server according to claim 14, wherein the one or more processors are configured to perform operations comprising:
receiving, from an access node of a mobile communication network, an indication of one or more candidate user equipments for supporting mobile edge computing;
selecting at least one target user equipment from the one or more candidate user equipments for execution of computational tasks; and
distributing a computational task to the selected at least one target user equipment.

16. A system for supporting mobile edge computing, the system comprising:
an access node of a mobile communication network; and
a mobile edge computing server,
wherein the access node is configured to perform operations comprising:
controlling access of a group of user equipments to the mobile communication network;

selecting one or more of the user equipments from the group as candidate user equipment for supporting mobile edge computing, based on measurements performed by the access node or performed by the UE; and sending an indication of said one or more candidate user equipments to the mobile edge computing server, and wherein the mobile edge computing server is configured to perform operations comprising:

receiving the indication of the one or more candidate user equipments from the access node;

selecting, from the one or more candidate user equipments, at least one target user equipment for execution of computational tasks; and distributing a computational task to the selected at least one target user equipment, wherein the indication enables the mobile edge computing server to select at least one target mobile edge computing user equipment from the one or more candidate user equipments for execution of computational tasks, and to distribute the computational tasks to the selected at least one target user equipment.

17. The method according to claim 1, wherein the indication enables the mobile edge computing server to select at least one target mobile edge computing user equipment from the one or more candidate user equipments for execution of computational tasks.

* * * * *